United States Patent
Ogawa

(10) Patent No.: US 8,851,248 B2
(45) Date of Patent: Oct. 7, 2014

(54) ROTARY DAMPER

(75) Inventor: Masaki Ogawa, Tokyo (JP)

(73) Assignee: Sugatsune Kogyo Co, Ltd., Tokyo (JP)

( * ) Notice: Subject to any disclaimer, the term of this patent is extended or adjusted under 35 U.S.C. 154(b) by 204 days.

(21) Appl. No.: 13/498,333

(22) PCT Filed: Jul. 29, 2010

(86) PCT No.: PCT/JP2010/004811
§ 371 (c)(1),
(2), (4) Date: Mar. 27, 2012

(87) PCT Pub. No.: WO2011/039922
PCT Pub. Date: Apr. 7, 2011

(65) Prior Publication Data
US 2012/0181128 A1    Jul. 19, 2012

(30) Foreign Application Priority Data

Sep. 30, 2009 (JP) ................................. 2009-226672

(51) Int. Cl.
*F16F 9/14* (2006.01)
*E05F 3/14* (2006.01)

(52) U.S. Cl.
CPC .. *F16F 9/145* (2013.01); *E05F 3/14* (2013.01)
USPC .......................................... 188/290; 16/341

(58) Field of Classification Search
CPC .......... E05F 3/14; F16F 9/145; F16F 2232/04
USPC ............. 188/290; 4/248; 16/54, 341, 342, 84, 16/DIG. 9, DIG. 21
See application file for complete search history.

(56) References Cited

U.S. PATENT DOCUMENTS 6,634,033 B2 * 10/2003 Mizuno et al. ..................... 4/248
8,240,007 B2 * 8/2012 Duan et al. ....................... 16/330
2010/0270113 A1 * 10/2010 Ogawa ........................... 188/281

FOREIGN PATENT DOCUMENTS

JP 2001-182770 A 7/2001
JP 4064235 B2 3/2008
(Continued)

OTHER PUBLICATIONS

Office Action in corresponding Chinese application No. 201080043427.X dated Jun. 27, 2013 (16 pages).
(Continued)

*Primary Examiner* — Anna Momper
(74) *Attorney, Agent, or Firm* — Osha Liang LLP

(57) ABSTRACT

Theme
To provide a rotary damper in which a rotor and a piston can be assembled with less labor.
Means to Solve
A first cam mechanism 8 is provided between outer portions of opposite surfaces of a rotor 2 and a piston 3. A shaft portion 2c is integrally formed in a central portion of the opposite surface of the rotor 2 opposed to the piston 3. A pair of outwardly projecting portions 9a, 9a are formed in an outer peripheral surface of the shaft portion 2c. A through hole 3a in which the shaft portion 2c is inserted is formed in the piston 3. A pair of inwardly projecting portions 9b, 9b are formed in an inner peripheral surface of the through hole 3a. The outwardly projecting portions 9a, 9a are arranged such that each of the outwardly projecting portions 9a can pass through a gap between the inwardly projecting portions 9b, 9b and the inwardly projecting portions 9b, 9b are arranged such that each of the inwardly projecting portions 9b can pass through a gap between the outwardly projecting portions 9a, 9a. A second cam mechanism 9 is provided between opposite surfaces of the outwardly projecting portion 9a and the inwardly projecting portion 9b opposed to each other when the rotor 2 is rotated through a predetermined angle after the outwardly projecting portion 9a have passed through the gap between the inwardly projecting portions 9b, 9b.

10 Claims, 7 Drawing Sheets

(56) References Cited

FOREIGN PATENT DOCUMENTS

| JP | 2008-215578 A | 9/2008 |
| KR | 10-2006-0080108 A | 7/2006 |
| WO | WO 2009081893 A1 * | 7/2009 |

OTHER PUBLICATIONS

International Search Report w/translation from PCT/JP2010/004811 dated Nov. 2, 2010 (2 pages).

* cited by examiner

ROTARY DAMPER

TECHNICAL FIELD

The present invention relates to a rotary damper in which a piston is surely moved accompanying a rotation of a rotor.

BACKGROUND ART

This type of rotary damper generally includes a casing having an opening in one end and a bottom portion closing the other end, a rotor rotatably fitted in an end portion in the opening side of the casing, a piston movably but non-rotatably disposed in the casing, the piston being located between the rotor and the bottom portion and dividing an inner space of the casing into a first chamber in the bottom portion side and a second chamber in the rotor side and a cam member having a basal end portion disposed in the first chamber and a distal end portion rotatably and movably passing through the piston and non-rotatably connected to the rotor.

A first cam mechanism is provided between opposite surfaces of the rotor and the piston opposed to each other. The first cam mechanism causes the piston to be moved from the second chamber side to the first chamber side when the rotor is rotated in one direction and the first cam mechanism allows the piston to be moved from the first chamber side to the second chamber side when the rotor is rotated in the other direction. A large-diameter portion is formed in the basal end portion of the cam member and a second cam mechanism is provided between opposite surfaces of the large-diameter portion and the piston opposed to each other. The second cam mechanism allows the piston to be moved from the second chamber side to the first chamber side when the rotor is rotated in one direction and the second cam mechanism causes the piston to be moved from the first chamber side to the second chamber side when the rotor is rotated in the other direction. Accordingly, regardless of direction in which the rotor is rotated, the piston is moved either by the first cam mechanism or by the second cam mechanism. Therefore, the piston is surely moved accompanying the rotation of the rotor.

PATENT DOCUMENTS

Patent Document 1: Japanese Patent No. 4064235

SUMMARY OF INVENTION

Technical Problem

In a conventional rotary damper as described above, since the cam member passes through the piston, when the rotor, the piston and the cam member are assembled, it is necessary to have the cam member inserted in the piston first, and then while maintaining the cam member in this condition, the distal end portion of the cam member has to be fitted in the rotor. So, it takes a lot of trouble to assemble the rotor, the piston and the cam member.

Solution to Problem

To solve the problem mentioned above, the present invention provides a rotary damper including: a casing having an opening in one end portion thereof and a bottom portion in the other end portion thereof; a rotor disposed inside the one end portion of the casing in the opening side such that the rotor is rotatable about a rotation axis; a piston disposed inside a portion of the casing between the rotor and the bottom portion such that the piston is non-rotatable but movable in the direction of the rotation axis, the piston dividing an inner space of the casing into a first chamber in the bottom portion side and a second chamber in the rotor side; fluid filled in the first chamber and the second chamber; a first cam mechanism and a second cam mechanism provided between the rotor and the piston, the first cam mechanism and the second cam mechanism causing the piston to be moved in the direction of the rotation axis accompanying rotation of the rotor; wherein the first cam mechanism is formed between opposite surfaces of the rotor and the piston opposed to each other; a shaft portion extending toward the bottom portion is formed in a central portion of an end surface of the rotor opposed to the piston; at least one outwardly projecting portion is formed in an outer peripheral surface of the shaft portion; a receiving portion in which the shaft portion is rotatably inserted is formed in a central portion of the opposite surface of the piston opposed to the rotor; at least one inwardly projecting portion is formed in an inner peripheral surface of the receiving portion; the at least one inwardly projecting portion is disposed nearer to the rotor than the at least one outwardly projecting portion; and the second cam mechanism is provided between opposite surfaces of the at least one outwardly projecting portion and the at least one inwardly projecting portion opposed to each other in the direction of the rotation axis.

In this case, it is preferable that the at least one outwardly projecting portion and the at least one inwardly projecting portion are arranged such that when the rotor is rotated with respect to the piston to a predetermined position after the shaft portion is inserted into the receiving portion from an opening portion in the rotor side up to a predetermined position, the at least one outwardly projecting portion and the at least one inwardly projecting portion are opposed to each other in the direction of the rotation axis.

It is preferable that the shaft portion is integrally formed in the rotor.

It is preferable that the at least one outwardly projecting portion includes two outwardly projecting portions spaced from each other by 180 degrees in a circumferential direction of the shaft portion; the at least one inwardly projecting portion includes two inwardly projecting portions spaced from each other by 180 degrees in a circumferential direction of the receiving portion; and each of the outwardly projecting portions can be moved through a gap between the inwardly projecting portions.

It is preferable that the receiving portion is formed as a through hole extending through the piston in the direction of the rotation axis; a portion of an inner space of the receiving portion including a gap between the outer peripheral surface of the shaft portion and the inner peripheral surface of the receiving portion functions as a communication passage communicating between the first chamber and the second chamber and allowing the fluid to flow in the communication passage substantially free from resistance; a valve mechanism for opening and closing the receiving portion is provided inside a portion of the receiving portion located nearer to the bottom portion than the shaft portion; and the valve mechanism comprises a valve seat formed in the inner peripheral surface of the receiving portion and a valve body that can open and close the receiving portion by being spaced from and seated on the valve seat, the valve body being moved by the fluid with respect to the valve seat in the direction of the rotation axis of the casing.

It is preferable that the valve seat is formed of a concavely curved surface extending in a direction orthogonal to the rotation axis, a central portion of the concavely curved surface in a width direction located nearer to the second chamber compared with opposite end portions of the concavely curved surface in the width direction; the valve body is formed in a shape of a plate such that the valve body is contacted with the opposite end portions of the valve seat in the width direction and a gap is formed between the valve body and the central portion of the valve seat in the width direction when the valve body is seated on the valve seat in a natural state in which no external force works on the valve body; the valve body is elastically deformable so that the valve body can be elastically deformed corresponding to an amount of pressure with which the fluid presses the valve body against the valve seat; and when the pressure of the fluid exceeds a predetermined amount, the valve body can be elastically deformed until the valve body is press-contacted with at least an annular portion of the valve seat surrounding the receiving portion and thereby completely closing the receiving portion.

Advantageous Effects of Invention

According to the present invention having the above-mentioned features, the rotor and the piston can be assembled by simply inserting the shaft portion into the receiving portion up to the predetermined position, in other words, with a simple operation. Thus, the rotor and the piston can be easily assembled.

BRIEF DESCRIPTION OF DRAWINGS

FIG. 6(A) is a front view of the rotor; FIG. 6(B) is a side view of the rotor; FIG. 6(C) is a view on arrow C of FIG. 6(A); and FIG. 6(D) is a perspective view of the rotor.

FIG. 7(A) is a front view of the piston; FIG. 7(B) is a side view of the piston; FIG. 7(C) is a plan view of the piston; FIG. 7 (D) is a bottom view of the piston; FIG. 7 (E) is a cross-sectional view along line E-E of FIG. 7(B); and FIG. 7(F) is a perspective view of the piston.

DESCRIPTION OF EMBODIMENTS

A best mode for carrying out the present invention will be described hereinafter with reference to drawings.

Figure 1:
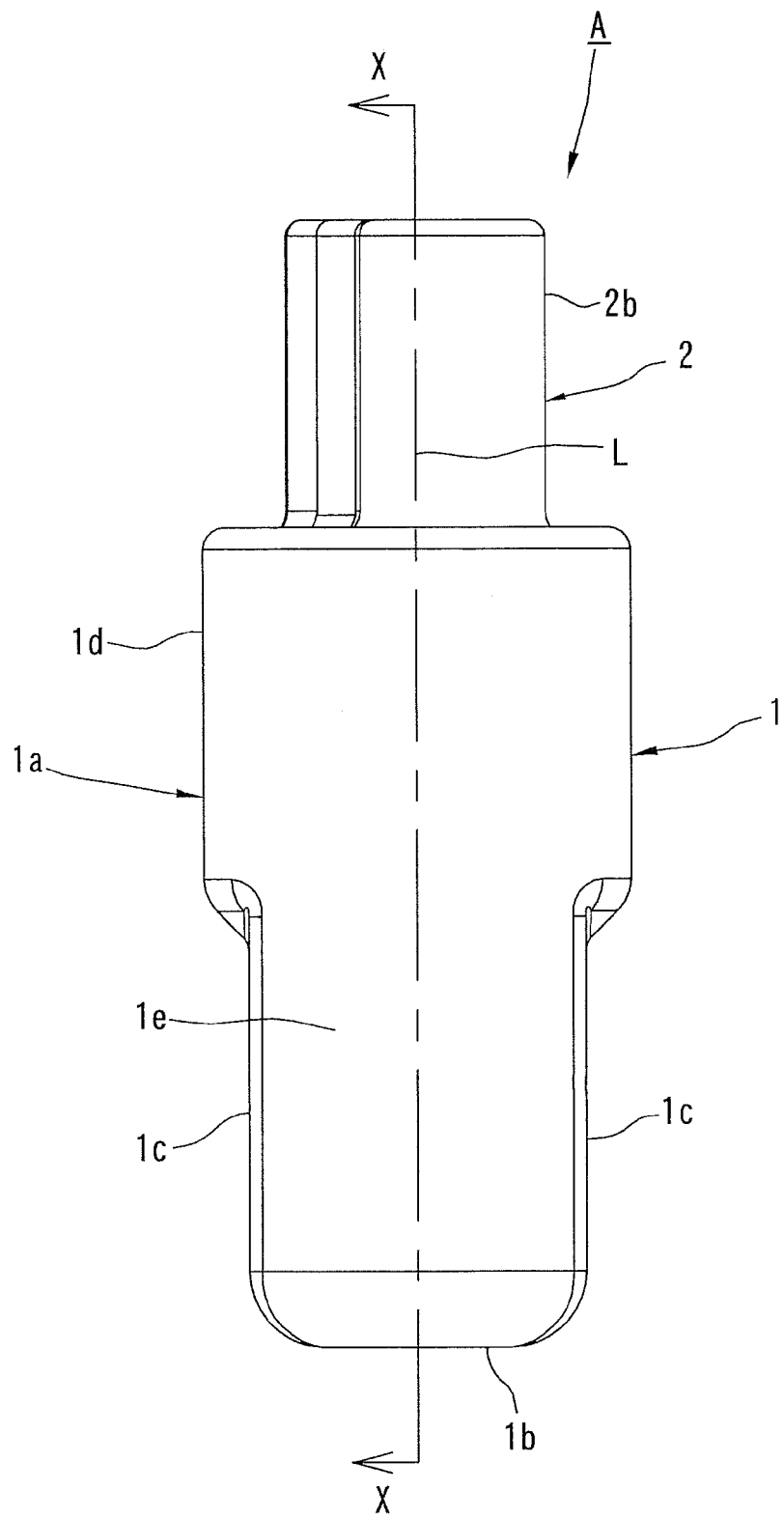
FIG. 1 is a front view of an embodiment of the present invention.
Figure 2:
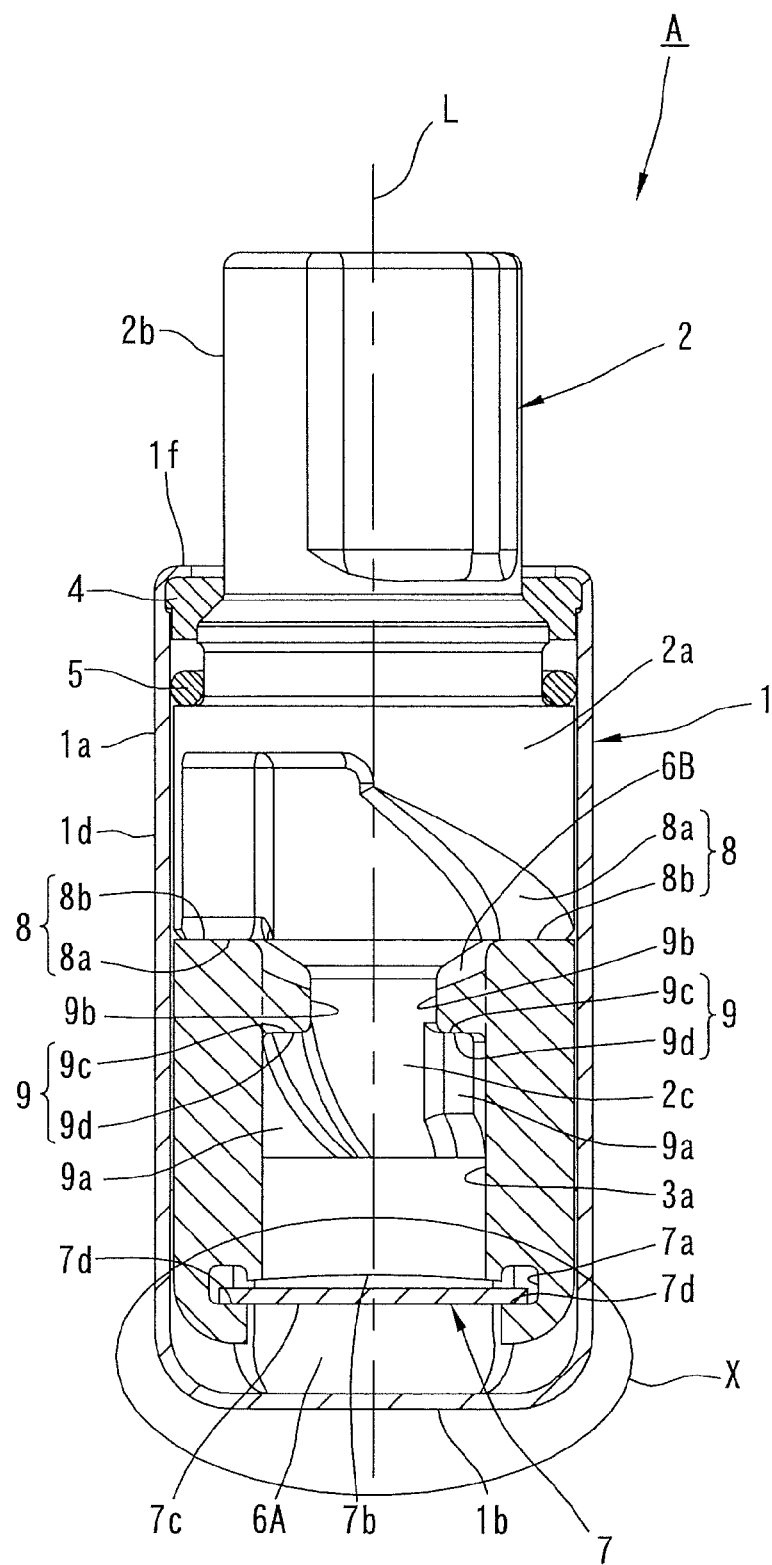
FIG. 2 is an enlarged cross-sectional view along line X-X of FIG. 1.
Figure 3:
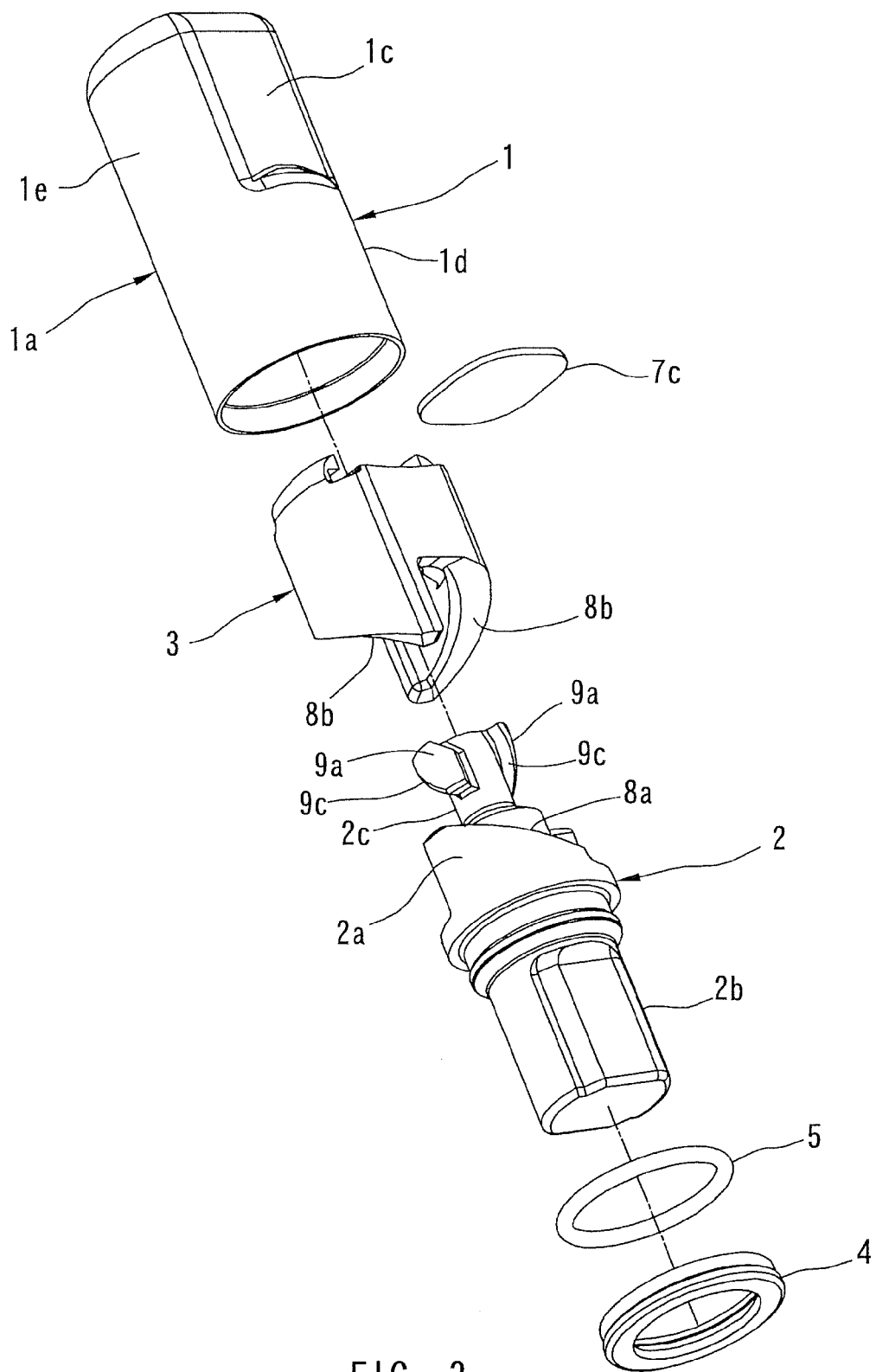
FIG. 3 is an exploded perspective view of the embodiment.
Figure 4:
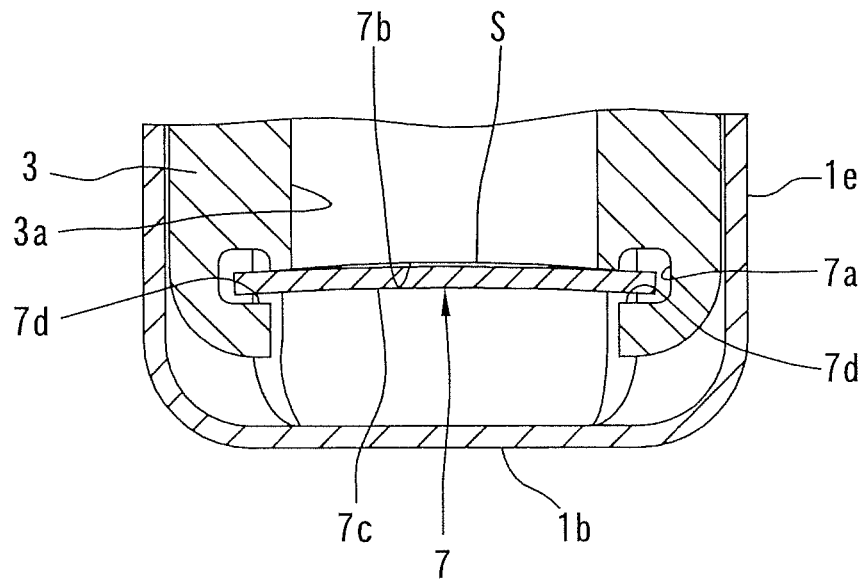
FIG. 4 is an enlarged view of a portion marked X in FIG. 2 showing a valve body seated on a valve seat when a rotor is rotated at a low speed.

FIGS. 1 to 7 show an embodiment of the present invention. As shown in FIGS. 1 to 3, a rotary damper A according to the embodiment includes a casing 1, a rotor 2, and a piston 3 as main components.

The casing 1 is formed of metal plate or hard resin into a bottomed cylindrical shape having a cylindrical part 1a with an opening in one end thereof (upper end in FIG. 2) and a bottom portion 1b closing the other end portion of the cylindrical part 1a. Two flat portions 1c, 1c are formed in an end portion of the cylindrical part 1a in the bottom portion 1b side. The flat portions 1c, 1c are spaced from each other by 180 degrees in a circumferential direction of the cylindrical part 1a. By the formation of the flat portions 1c, 1c, the cylindrical part 1a is sectioned into a circular cylindrical portion 1d located in the opening side and having a circular cross section and a flat cylindrical portion 1e located in the bottom portion 1b side and having an oval cross section.

Figure 6:
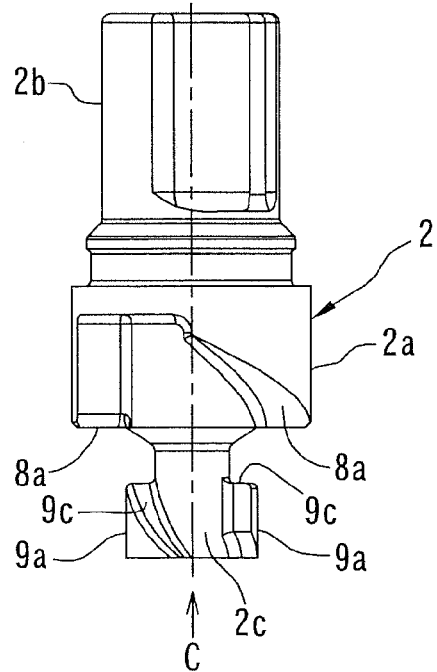
FIG. 6 shows the rotor used in the embodiment.
Figure 6:
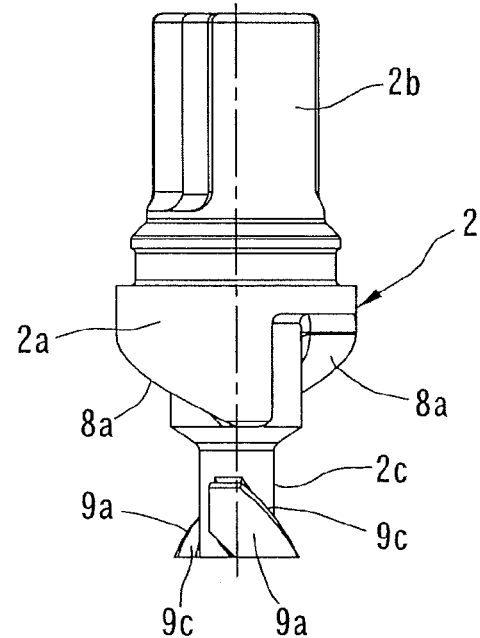
Figure 6:
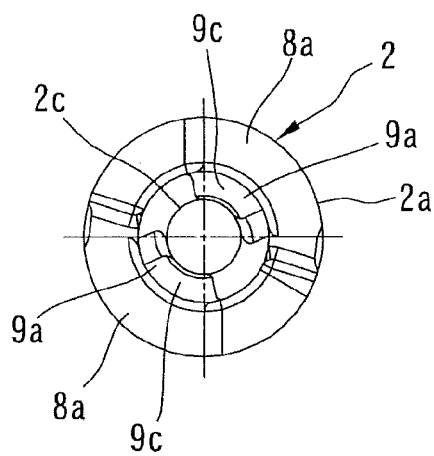
Figure 6:
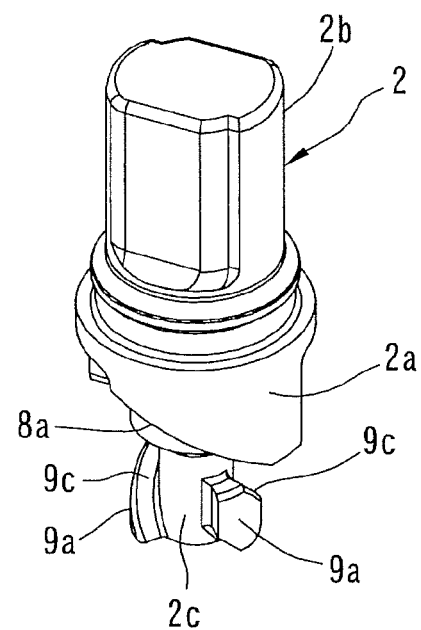

As shown in FIGS. 2, 3 and 6, the rotor 2 has a fitting portion 2a in one end portion (lower end portion in FIG. 2) thereof. The fitting portion 2a is fitted in the circular cylindrical portion 1d such that the fitting portion 2a can be rotated about an axis (hereinafter referred to as a rotation axis) L thereof. A connecting shaft portion 2b is formed in the other end portion of the rotor 2. As shown in FIGS. 1 and 2, the connecting shaft portion 2b is outwardly protruded from the casing 1 and non-rotatably connected to one of two members that are rotatable with respect to each other. The casing 1 is non-rotatably connected to the other of the two members.

The rotor 2 is prevented from escaping from the casing 1. Specifically, an engagement piece 1f is formed in an end portion of the casing 1 in the opening side by bending the end portion of the casing 1 inwardly in a radial direction. The rotor 2 is abutted against the engagement piece 1f via a stopper 4, and is prevented from escaping from the casing 1. A gap between an outer peripheral surface of the rotor 2 and an inner peripheral surface of the circular cylindrical portion 1d is sealed by a seal member 5 such as an O-ring.

As shown in FIG. 2, the piston 3 is inserted in a portion of the casing between the bottom portion 1b and the rotor 2. At least a portion of the piston 3 is fitted in the flat cylindrical portion 1e such that the piston 3 is non-rotatable but movable in a direction of the rotation axis L. By this arrangement, the piston 3 is made non-rotatable but movable in the direction of the rotation axis L with respect to the casing 1.

The piston 3 disposed inside the casing 1 divides an inner space of the casing 1 into a first chamber 6A between the bottom portion 1b and the piston 3 and a second chamber 6B between the rotor 2 and the piston 3. The first and the second chambers 6A, 6B are filled with fluid, which typically is viscose fluid.

Figure 7:
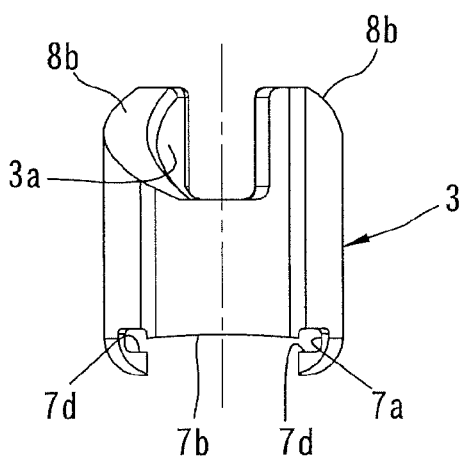
FIG. 7 shows the piston used in the embodiment.
Figure 7:
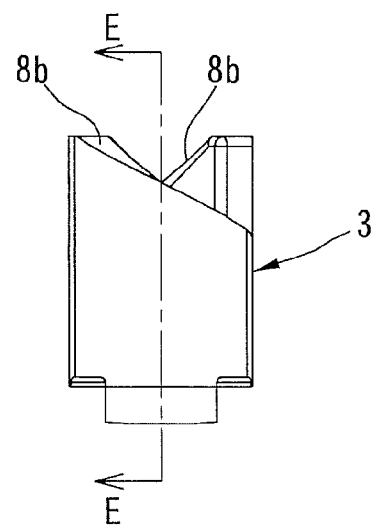
Figure 7:
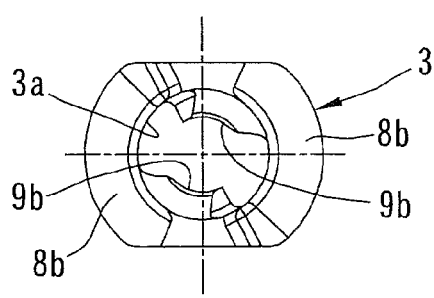
Figure 7:
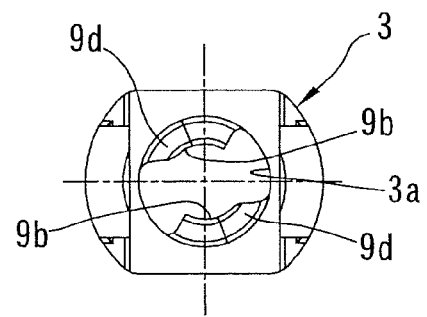
Figure 7:
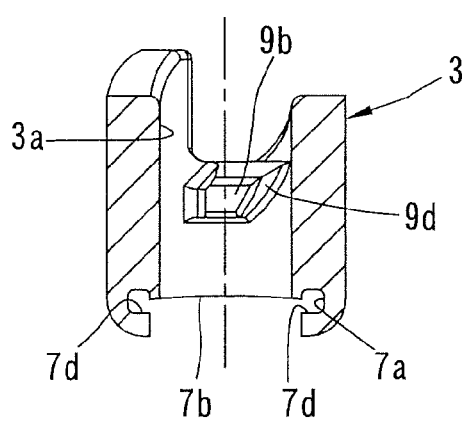
Figure 7:
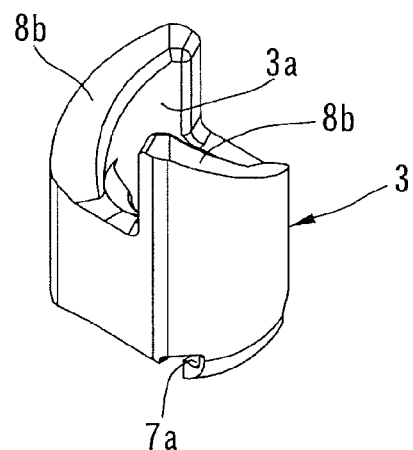

As shown in FIGS. 2, 3 and 7, a through hole (receiving portion) 3a is formed in the piston 3. The through hole 3a passes though a central portion of the piston 3 along the rotation axis L. The through hole 3a functions as a communication passage communicating between the first chamber 6A and the second chamber 6B. The fluid in the second chamber 6B flows into the first chamber 6A through the through hole 3a substantially free from resistance when the piston 3 is moved from the first chamber 6A side to the second chamber 6B side. Accordingly, the piston 3 can be moved at a high speed from the first chamber 6A side to the second chamber 6B side. When the piston 3 is moved from the second chamber 6B side to the first chamber 6A side, the fluid in the first chamber 6A is moved to flow into the second chamber 6B through the through hole 3a. However, at this time, the through hole 3a is closed by a valve mechanism 7 to be described later. Therefore, the fluid in the first chamber 6A flows into the second chamber 6B through a gap formed between an outer peripheral surface of the piston 3 and an inner peripheral surface of the casing 1. However, the gap between the outer peripheral surface of the piston 3 and the inner peripheral surface of the casing 1 is very narrow, and works as a kind of orifice on the fluid flowing therein. Accordingly, when the fluid in the first chamber 6A flows into the second chamber 6B, large flow resistance is generated, thereby the transfer speed of the piston 3 is maintained at a low speed.

The valve mechanism 7 is disposed in an end portion of the through hole 3a in the bottom portion 1b side. The valve mechanism 7 is constructed in the following manner. A slit 7a is formed in an end portion of the piston 3 in the bottom portion 1b side. The slit 7a transversely extends across the piston 3 in a direction orthogonal to the rotation axis L. A valve seat 7b is formed in a surface of the slit 7a opposed to the bottom portion 1b (of two surfaces of the slit 7a facing the direction of the rotation axis L, the surface located nearer to the rotor 2). A width (width in a direction orthogonal to both the direction in which the slit 7a transversely extends and the direction of the rotation axis L) and a length of the valve seat 7b are sized to be greater than a diameter of the through hole 3a. Accordingly, the valve seat 7b is formed so as to surround the through hole 3a. The valve seat 7b is formed of a circular arc surface extending in the direction orthogonal to the rotation axis L. The circular arc surface constituting the valve seat 7b is arranged such that a center line of curvature thereof is orthogonal to the rotation axis L. Accordingly, the valve seat 7b is concaved such that a central portion of the valve seat 7b in the width direction (the direction orthogonal to both the direction in which the slit 7a transversely extends and the direction of the rotation axis L; right and left direction in FIGS. 7(A) and 7(B)) is located nearer to the second chamber 6B compared with opposite end portions of the valve seat 7b. The valve seat 7b is not necessarily formed of the circular arc surface, but may be formed of another smooth concavely curved surface such as an ellipsoidal surface.

A valve body 7c is inserted in the slit 7a. The valve body 7c has a shape of a flat plate in a natural state in which no external force works thereon. A thickness of the valve body 7c (dimension in the direction of the rotation axis L) is sized to be smaller than a dimension of the slit 7a in the direction of the rotation axis L. Accordingly, the valve body 7c can be moved in the direction of the rotation axis L by a difference between the dimension of the valve body 7c and the dimension of the slit 7a in the direction of the rotation axis L. When the fluid in the second chamber 6B flows into the first chamber 6A, the valve body 7c is moved by the fluid toward the bottom portion 1b and supported by a support surface 7d of the slit 7a. The through hole 3a is open in this condition. In other words, a portion of the through hole 3a located further upstream than the valve seat 7b is communicated with the first chamber 6A through a gap between the valve seat 7b and the valve body 7c. The gap formed between the valve seat 7b and the valve body 7c is sized so as to allow the fluid to flow substantially free from resistance. On the other hand, when the fluid in the first chamber 6A flows into the second chamber 6B, the valve body 7c is pressed against the valve seat 7b by the fluid. That is, the valve body 7c is seated on the valve seat 7b. By this, the through hole 3a is closed. However, the way the through hole 3a is closed by the valve body 7c varies according to pressure inside the first chamber 6A as described below.

That is, when the valve body 7c is simply seated on the valve seat 7b, the valve body 7 is contacted with the valve seat 7b only at the opposite end portions in the width direction of the valve seat 7b. This is because the valve body 7c is formed in the shape of the flat plate while the valve seat 7b is formed of the circular arc surface. As a result, a gap S (see FIG. 4) is formed between the valve body 7c and the valve seat 7b. In this condition, a part of the fluid in the first chamber 6A flows into the second chamber 6B through the gap S and the through hole 3a, thereby causing resistance against the fluid flowing from the first chamber 6A to the second chamber 6B to be smaller according to the amount of the fluid flowing into the second chamber 6B through the gap S and the through hole 3a. Thus, when the piston 3 is moved from the second chamber 6B side to the first chamber 6A side at a low speed, the resistance against the fluid is small.

Figure 5:
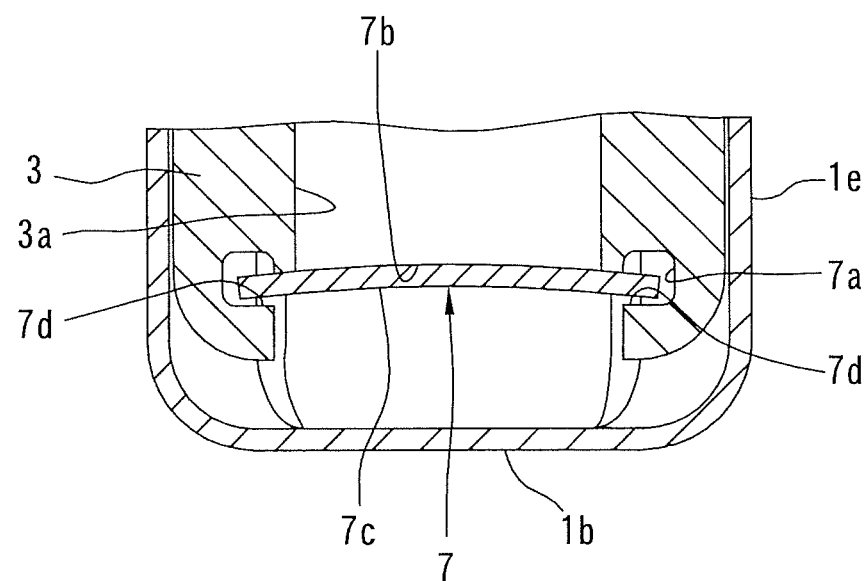
FIG. 5 is an enlarged view of the portion marked X in FIG. 2 showing the valve body seated on the valve seat when the rotor is rotated at a high speed.

Here, the valve body 7c is made of resin or metal, and has both appropriate strength and elasticity. Therefore, when the speed of the piston 3 is increased and the pressure of the fluid in the first chamber 6A is increased accordingly, the valve body 7c is elastically deformed by the fluid in the first chamber 6A such that the central portion of the valve body 7c is curved toward the second chamber 6B. As a result, a width (width in the direction of the rotation axis L) of the gap S is reduced. When the pressure inside the first chamber 6A exceeds a predetermined level, the valve body 7c is elastically deformed until it closes the gap S as shown in FIG. 5. At this time, the valve body 7c is press-contacted with at least a portion of the valve seat 7b surrounding the through hole 3a, and thereby, the through hole 3a is completely closed by the valve body 7c. As a result, the fluid in the first chamber 6A is not allowed to flow through the through hole 3a, and is forced to flow through the gap between the inner peripheral surface of the casing 1 and the outer peripheral surface of the piston 3, which is a kind of orifice. Therefore, a maximum resistance can be applied to the fluid flowing from the first chamber 6A to the second chamber 6B, and thereby, the transfer speed of the piston 3 from the second chamber 6B side to the first chamber 6A side can be maintained at a low speed.

A pair of first cam mechanisms 8, 8 are formed in outer portions of opposite surfaces of the fitting portion 2a and the piston 3, i.e. in portions of the opposite surfaces of the fitting portion 2a and the piston 3 located further outside than the through hole 3a. The pair of first cam mechanisms 8, 8 are spaced from each other by 180 degrees in a circumferential direction. The first cam mechanism 8 includes a cam surface 8a formed in the opposite surface of the fitting portion 2a opposed to the piston 3 (end face in the piston 3 side) and a cam surface 8b formed in the opposite surface of the piston 3 opposed to the fitting portion 2a (end face in the fitting portion 2a side). The cam surfaces 8a, 8b are constantly in contact with each other, and cause the piston 3 to be moved from the second chamber 6B side to the first chamber 6A side when the rotor 2 is rotated in one direction. When the rotor 2 is rotated in the other direction, the cam surfaces 8a, 8b??? allow the piston 3 to be moved from the first chamber 6A side to the second chamber 6B side. Either one of the cam surface 8a and the cam surface 8b may be formed as a projecting portion to be contacted against the other cam surface.

A shaft portion 2c having a circular cross-section is formed in a central portion of the opposite surface of the fitting portion 2a opposed to the piston 3. A diameter of the shaft portion 2c is sized to be smaller than the diameter of the through hole 3a by a predetermined amount. The shaft portion 2c extends along the rotation axis L towards the bottom portion 1b, and is inserted in the through hole 3a. A pair of second cam mechanisms 9, 9 are formed in an outer peripheral surface of the shaft portion 2c and an inner peripheral surface of the through hole 3a. The pair of the second cam mechanisms 9, 9 are spaced from each other by 180 degrees in the circumferential direction.

The cam mechanism 9 is constructed in the following manner. A pair of outwardly projecting portions 9a, 9a are formed in an outer circumferential surface of a distal end portion of the shaft portion 2c inserted in the through hole 3a. The pair of outwardly projecting portions 9a, 9a are spaced from each other by 180 degrees in the circumferential direction. Outer peripheral surfaces of the outwardly projecting portion 9a is rotatably contacted with the inner peripheral surface of the through hole 3a or slightly spaced from the inner peripheral surface of the through hole 3a. On the other hand, a pair of inwardly projecting portions 9b, 9b are formed in an end portion of the inner peripheral surface of the through hole 3a in the rotor 2 side. The pair of the inwardly projecting portions 9b, 9b are spaced from each other by 180 degrees in the circumferential direction. Inner peripheral surfaces of the inwardly projecting portion 9b is rotatably contacted with the outer peripheral surface of the shaft portion 2c or slightly spaced from the outer peripheral surface of the shaft portion 2c.

The outwardly projecting portions 9a, 9a and the inwardly projecting portions 9b, 9b are arranged such that each of the outwardly projecting portions 9a, 9a can pass through a gap between the pair of the inwardly projecting portions 9b, 9b in the direction of the rotation axis L and each of the inwardly projecting portions 9b, 9b can pass through a gap between the pair of the outwardly projecting portions 9a, 9a in the direction of the rotation axis L. With the outwardly projecting portions 9a, 9a and the inwardly projecting portions 9b, 9b arranged in this manner, to assemble the rotor 2 and the piston 3 together, firstly, the rotor 2 and the piston 3 are aligned such that each of the outwardly projecting portions 9a, 9a is opposed to the gap between the inwardly projecting portions 9b, 9b and each of the inwardly projecting portions 9b, 9b is opposed to the gap between the outwardly projecting portions 9a, 9a. Then the shaft portion 2c is inserted into the through hole 3a from an open portion in the rotor 2 side. As a result, each of the outwardly projecting portions 9a, 9a enters the gap between the inwardly projecting portions 9b, 9b and each of the inwardly projecting portions 9b, 9b enters the gap between the outwardly projecting portions 9a, 9a. When the shaft portion 2c is inserted into the through hole 3a up to a predetermined position, the outwardly projecting portions 9a, 9a pass through the gap between the inwardly projecting portions 9b, 9b and are positioned nearer to the bottom portion 1b than the inwardly projecting portions 9b, 9b. With the outwardly projecting portions 9a, 9a and the inwardly projecting portions 9b, 9b maintained in this condition, when the rotor 2 is rotated with respect to the piston 3 through a predetermined angle, for example 90 degrees, an end surface of the outwardly projecting portion 9a facing the rotor 2 side and an end surface of the inwardly projecting portion 9b facing the bottom portion 1b side become opposed to each other in the direction of the rotation axis L. Cam surfaces 9c, 9d are respectively formed in the opposite surfaces of the outwardly projecting portion 9a and the inwardly projecting portion 9b. The cam surfaces 9c, 9d constitute the second cam mechanism 9.

The cam surfaces 9c, 9d of the second cam mechanism 9 are constantly contacted with each other, and allow the piston 3 to be moved from the second chamber 6B side to the first chamber 6A side when the rotor 2 is rotated in the one direction. When the rotor 2 is rotated in the other direction, the cam surfaces 9c, 9d cause the piston 3 to be moved from the first chamber 6A side to the second chamber 6B side. Therefore, when the rotor 2 is rotated in the one direction, the piston 3 is moved by the first cam mechanism 8 from the second chamber 6B side to the first chamber 6A side, and when the rotor 2 is rotated in the other direction, the piston 3 is moved by the second cam mechanism 9 from the first chamber 6A side to the second chamber 6B side. Thus, the piston 3 is surely moved according to the rotation of the rotor 2 without being left unmoved when the rotor 2 is rotated. Either one of the cam surface 9c and the cam surface 9d may be formed as a projecting portion to be contacted against the other cam surface.

Although the shaft portion 2c and the outwardly projecting portions 9a, 9a are inserted in the through hole 3a and at the same time the inwardly projecting portions 9b, 9b are formed in the inner peripheral surface of the through hole 3a, the through hole 3a is not to be closed. This is because an outer diameter of the shaft portion 2c is sized to be smaller than the diameter of the through hole 3a, the outwardly projecting portions 9a, 9a are arranged away from each other in the circumferential direction, and the inwardly projecting portions 9b, 9b are arranged away from each other in the circumferential direction. Owing to these arrangements, the fluid in the first chamber 6A and the second chamber 6B can flow inside the through hole 3a substantially free from resistance through a gap formed among the inner peripheral surface of the through hole 3a, the outer peripheral surface of the shaft portion 2c, the outwardly projecting portion 9a and the inwardly projecting portion 9b.

Let us assume that the rotary damper A having the above-described features is disposed as depicted in FIG. 2. Specifically, the rotary damper A is disposed with the rotor 2 located in the upper side and the bottom portion 1b located in the lower side and the rotor 2 is in a stopped condition with the piston 3 at a position nearest to the bottom portion 1b. In this condition, the valve body 7c is contacted with the support surface 7d. When the rotary damper A is placed in a vertically reverse orientation, the valve body 7c is contacted with the valve seat 7b. When the rotary damper A is horizontally disposed, the valve body 7c is either contacted with either one of the valve seat 7b and the support surface 7d or disposed between the valve seat 7b and the support surface 7d.

When the rotor 2 is rotated in the other direction, the piston 3 is moved from the first chamber 6A side to the second chamber 6B side. As a result, the fluid in the second chamber 6B is moved toward the first chamber 6A through the through hole 3a, thereby pressing the valve body 7c against the support surface 7d. As a result, the through hole 3a is opened, and the fluid in the second chamber 6B can flow into the first chamber 6A substantially free from resistance. Therefore, the piston 3 can be moved from the first chamber 6A side to the second chamber 6B side at a high speed and the rotor 2 can be rotated in the other direction at a high speed.

In a condition where the piston 3 is moved to the second chamber 6B side, when the rotor 2 is rotated in the one direction, the piston 3 is moved from the second chamber 6B side to the first chamber 6A side. As a result, the fluid in the first chamber 6A is moved toward the second chamber 6B through the through hole 3a. However, the movement of the fluid in the first chamber 6A causes the valve body 7c to be seated on the valve seat 7b, thereby closing the through hole 3a. Therefore, the fluid in the first chamber 6A flows into the second chamber 6B through the gap between the inner peripheral surface of the casing 1 and the outer peripheral surface of the piston 3 which constitutes a kind of orifice. The flow resistance at this time maintains the transfer speed of the piston 3 from the second chamber 6B side to the first chamber 6A side at a low speed, thereby maintaining the rotation speed of the rotor 2 in the one direction at a low speed. In other words, a damper effect is achieved. Particularly, in this embodiment, since the valve body 7c is elastically deformably formed and the valve seat 7b is formed of the circular cylindrical surface in the concaved configuration, the damper effect is increased as the rotation speed of the rotor 2 is increased.

To assemble the rotary damper A as described above, the rotor 2 and the piston 3 are aligned coaxially and in the circumferential direction at the same time. Next, the shaft portion 2c is inserted in the through hole 3a from the open portion of the through hole 3a in the rotor 2 side up to the predetermined position. After that, the rotor 2 is rotated with respect to the piston 3 through the predetermined angle. This completes the assembly of the rotor 2 and the piston 3. After that, the seal member 5 and the stopper 4 are fitted to the rotor 2 in this order. The valve body 7c is fitted to the piston 3. The fitting of the seal member 5 and the stopper 4 to the rotor 2 and the fitting of the valve body 7c to the piston 3 may be done before the assembly of the rotor 2 and the piston 3. After that, the piston 3 and the rotor 2 are inserted in the casing 1 in this order. Then the engagement piece 1f is made by bending, which completes the assembly of the rotary damper A.

As described above, the rotor 2 and the piston 3 can be assembled by inserting the shaft portion 2c into the through hole 3a and then rotating the rotor 2 through the predetermined angle. In other words, the rotor 2 and the piston 3 can be assembled simply by two actions. Therefore, in the rotary damper A of the present invention, the rotor 2 and the piston 3 can be assembled with less labor compared with the conventional rotary damper, in which a cam member should be inserted into a piston, and after that, while maintaining the cam member and the piston in this condition, a distal end of the cam member should be fitted to a rotor.

Figure 8:
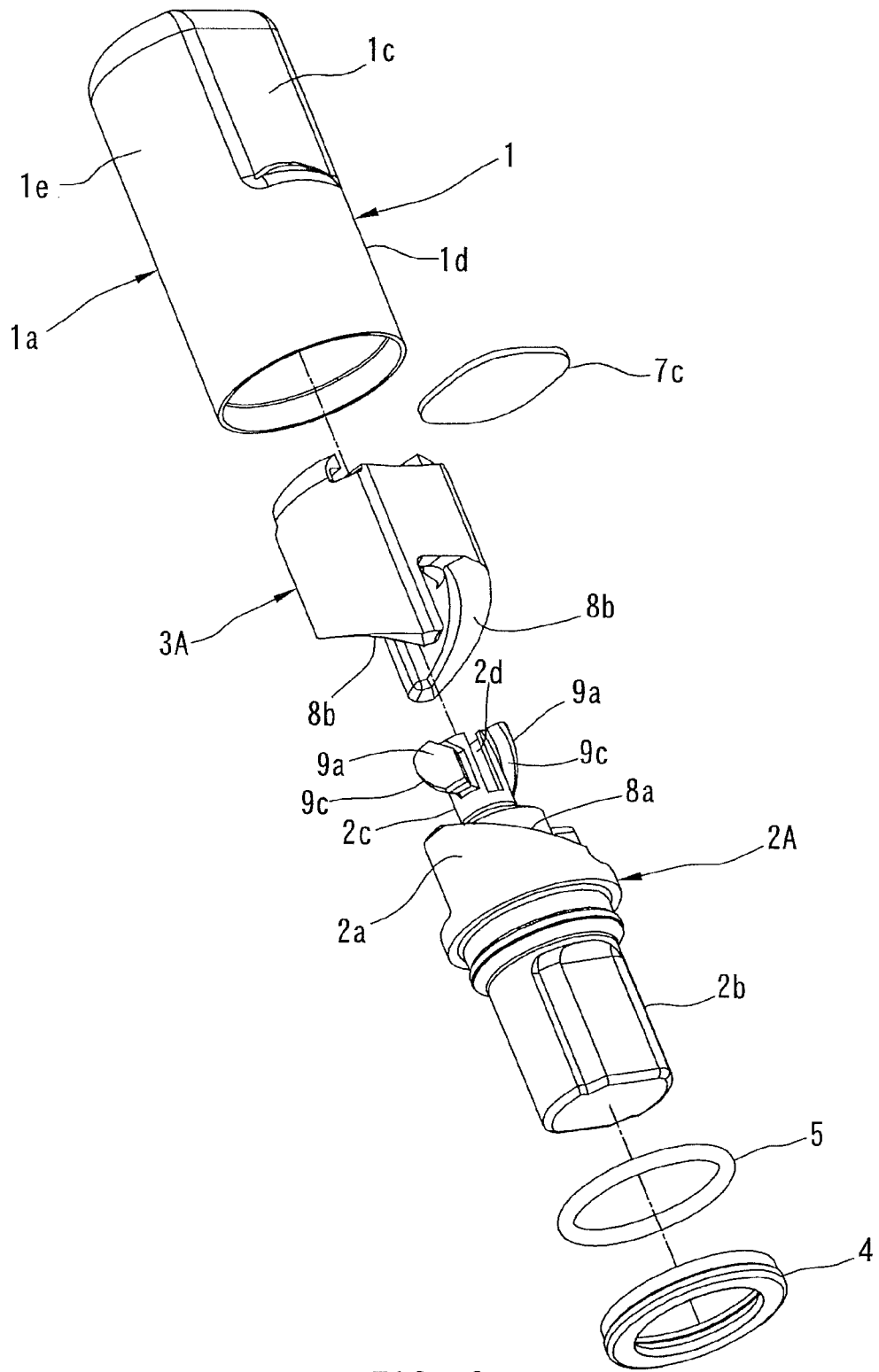
FIG. 8 is an exploded perspective view of another embodiment of the present invention.

FIG. 8 shows another embodiment of the present invention. In this embodiment, a rotor 2A and a piston 3A are used in place of the rotor 2 and the piston 3. A hole (not shown) is formed in the shaft portion 2c of the rotor 2A. The hole extends from a distal end surface of the shaft portion 2c to a basal end portion of the shaft portion 2c along the rotation axis L, thereby the shaft portion 2c is formed in a cylindrical configuration. A plurality of slits 2d (two slits in this embodiment; only one of the slits 2d is shown in FIG. 8) are formed in a peripheral wall portion of the shaft portion 2c having the cylindrical configuration. This allows the shaft portion 2c to be elastically expanded or reduced in diameter, thereby allowing the two outwardly projecting portions 9a, 9a to be moved toward or away from each other in the radial direction of the shaft portion 2c.

One inwardly projecting portion (not shown) is formed in place of the two inwardly projecting portions 9b, 9b in the inner peripheral surface of the through hole 3a of the piston 3A. The inwardly projecting portion extends annually along the inner peripheral surface of the through hole 3a. Accordingly, when the shaft portion 2c is inserted in the through hole 3a, the outwardly projecting portions 9a, 9a are abutted against the inwardly projecting portion. Since the shaft portion 2c can be expanded or reduced in diameter and the outwardly projecting portions 9a, 9a can be moved toward each other, the outwardly projecting portions 9a, 9a abutted against the inwardly projecting portion can be moved toward each other, ride on the inwardly projecting portion and slide on an inner peripheral surface of the inwardly projecting portion as the shaft portion 2c is inserted. When the outwardly projecting portions 9a, 9a are moved over the inwardly projecting portion, the shaft portion 2c is expanded in diameter by its own elasticity. As a result, the outwardly projecting portions 9a, 9a and the inwardly projecting portion are opposed to each other in a direction of a rotation axis. A second cam mechanism is provided between opposite surfaces of the outwardly projecting portions 9a, 9a and the inwardly projecting portion.

In this embodiment, the rotor 2A and the piston 3A can be assembled without rotating the rotor 2A with respect to the piston 3A. That is, by aligning the cam surface 9c of the outwardly projecting portion 9a with a cam surface (not shown) of the inwardly projecting portion beforehand, the rotor 2A and the piston 3A can be assembled simply by inserting the shaft portion 2c into the through hole 3a. Thus, the rotor 2A and the piston 3A can be assembled more easily.

Although particular embodiments of the invention have been described above, it will be understood that various modifications may be made without departing from the scope of the invention described herein.

For example, while two each of the first and second cam mechanisms 8, 9 are formed in the embodiments described above, one each or three or more each of the first and second cam mechanisms 8, 9 may be formed.

For another example, while the shaft portion 2c is integrally formed in the rotor 2 in the embodiments described above, the shaft portion 2c may be formed separately from the rotor 2 and fixed to the rotor 2 with fixing means. For example, a screw hole may be formed in a central portion of an end surface of the fitting portion 2a opposed to the bottom portion 1b, and the shaft portion 2c may be fixed to the screw hole by screwing.

Moreover, while the through hole 3a is used as the receiving portion in the embodiments described above, a blind hole closed in the bottom portion 1b side may be used as the receiving portion in place of the through hole 3a.

Moreover, while the arrangements are made such that the damper effect is achieved only when the rotor 2 is rotated in the one direction in the embodiments described above, the damper effect may be achieved only when the rotor 2 is rotated in the other direction or the damper effect may be achieved whether the rotor 2 is rotated in a normal direction or in a reverse direction.

Moreover, while the valve seat 7b is formed in the concaved configuration in the embodiments described above, the valve seat 7b may be formed of a flat surface orthogonal to the rotation axis L.

INDUSTRIAL APPLICABILITY

The rotary damper according to the present invention may be used between two rotatable members on which a damper effect is required to be surely achieved.

REFERENCE SIGNS LIST

A rotary damper
L rotation axis
1 casing
2 rotor
2A rotor
2c shaft portion
3 piston
3A piston
3a through hole (receiving portion)
6A first chamber
6B second chamber
7 valve mechanism
7b valve seat
7c valve body
8 first cam mechanism
9 second cam mechanism
9a outwardly projecting portion
9b inwardly projecting portion

The invention claimed is:

1. A rotary damper comprising:
a casing having an opening in one end portion thereof and a bottom portion in the other end portion thereof;
a rotor disposed inside the one end portion of the casing in the opening side such that the rotor is rotatable about a rotation axis;
a piston disposed inside a portion of the casing between the rotor and the bottom portion such that the piston is non-rotatable but movable in the direction of the rotation axis, the piston dividing an inner space of the casing into a first chamber in the bottom portion side and a second chamber in the rotor side;

fluid filled in the first chamber and the second chamber;

a first cam mechanism and a second cam mechanism provided between the rotor and the piston, the first cam mechanism and the second cam mechanism causing the piston to be moved in the direction of the rotation axis accompanying rotation of the rotor;

wherein the first cam mechanism is formed between opposite surfaces of the rotor and the piston opposed to each other;

a shaft portion extending toward the bottom portion is formed in a central portion of an end surface of the rotor opposed to the piston;

at least one outwardly projecting portion is formed in an outer peripheral surface of the shaft portion;

a receiving portion in which the shaft portion is rotatably inserted is formed in a central portion of the opposite surface of the piston opposed to the rotor;

at least one inwardly projecting portion that is protruded inward in a radial direction of the receiving portion is formed in an inner peripheral surface of the receiving portion;

the at least one inwardly projecting portion is disposed nearer to the second chamber than the at least one outwardly projecting portion; and the second cam mechanism is provided between opposite surfaces of the at least one outwardly projecting portion and the at least one inwardly projecting portion opposed to each other in the direction of the rotation axis.

2. The rotary damper according to claim 1 wherein the at least one outwardly projecting portion and the at least one inwardly projecting portion are arranged such that when the rotor is rotated with respect to the piston to a predetermined position after the shaft portion is inserted into the receiving portion from an opening portion in the rotor side up to a predetermined position, the at least one outwardly projecting portion and the at least one inwardly projecting portion are opposed to each other in the direction of the rotation axis.

3. The rotary damper according to claim 2 wherein the shaft portion is integrally formed in the rotor.

4. The rotary damper according to claim 2 wherein the at least one outwardly projecting portion comprises two outwardly projecting portions spaced from each other by 180 degrees in a circumferential direction of the shaft portion; the at least one inwardly projecting portion comprises two inwardly projecting portions spaced from each other by 180 degrees in a circumferential direction of the receiving portion; and each of the outwardly projecting portions can be moved through a gap between the inwardly projecting portions.

5. The rotary damper according to claim 2 wherein the receiving portion is formed as a through hole extending through the piston in the direction of the rotation axis; a portion of an inner space of the receiving portion including a gap between the outer peripheral surface of the shaft portion and the inner peripheral surface of the receiving portion functions as a communication passage communicating between the first chamber and the second chamber and allowing the fluid to flow in the communication passage substantially free from resistance; a valve mechanism for opening and closing the receiving portion is provided inside a portion of the receiving portion located nearer to the bottom portion than the shaft portion; and the valve mechanism comprises a valve seat formed in the inner peripheral surface of the receiving portion and a valve body that can open and close the receiving portion by being spaced from and seated on the valve seat, the valve body being moved by the fluid with respect to the valve seat in the direction of the rotation axis of the casing.

6. The rotary damper according to claim 5 wherein the valve seat is formed of a concavely curved surface extending in a direction orthogonal to the rotation axis, a central portion of the concavely curved surface in a width direction located nearer to the second chamber compared with opposite end portions of the concavely curved surface in the width direction; the valve body is formed in a shape of a plate such that the valve body is contacted with the opposite end portions of the valve seat in the width direction and a gap is formed between the valve body and the central portion of the valve seat in the width direction when the valve body is seated on the valve seat in a natural state in which no external force works on the valve body; the valve body is elastically deformable so that the valve body can be elastically deformed corresponding to an amount of pressure with which the fluid presses the valve body against the valve seat; and when the pressure of the fluid exceeds a predetermined amount, the valve body can be elastically deformed until the valve body is press-contacted with at least an annular portion of the valve seat surrounding the receiving portion and thereby completely closing the receiving portion.

7. The rotary damper according to claim 1 wherein the shaft portion is integrally formed in the rotor.

8. The rotary damper according to claim 1 wherein the at least one outwardly projecting portion comprises two outwardly projecting portions spaced from each other by 180 degrees in a circumferential direction of the shaft portion; the at least one inwardly projecting portion comprises two inwardly projecting portions spaced from each other by 180 degrees in a circumferential direction of the receiving portion; and each of the outwardly projecting portions can be moved through a gap between the inwardly projecting portions.

9. The rotary damper according to claim 1 wherein the receiving portion is formed as a through hole extending through the piston in the direction of the rotation axis; a portion of an inner space of the receiving portion including a gap between the outer peripheral surface of the shaft portion and the inner peripheral surface of the receiving portion functions as a communication passage communicating between the first chamber and the second chamber and allowing the fluid to flow in the communication passage substantially free from resistance; a valve mechanism for opening and closing the receiving portion is provided inside a portion of the receiving portion located nearer to the bottom portion than the shaft portion; and the valve mechanism comprises a valve seat formed in the inner peripheral surface of the receiving portion and a valve body that can open and close the receiving portion by being spaced from and seated on the valve seat, the valve body being moved by the fluid with respect to the valve seat in the direction of the rotation axis of the casing.

10. The rotary damper according to claim 9 wherein the valve seat is formed of a concavely curved surface extending in a direction orthogonal to the rotation axis, a central portion of the concavely curved surface in a width direction located nearer to the second chamber compared with opposite end portions of the concavely curved surface in the width direction; the valve body is formed in a shape of a plate such that the valve body is contacted with the opposite end portions of the valve seat in the width direction and a gap is formed between the valve body and the central portion of the valve seat in the width direction when the valve body is seated on the valve seat in a natural state in which no external force works on the valve body; the valve body is elastically deformable so that the valve body can be elastically deformed corresponding to an amount of pressure with which the fluid presses the valve body against the valve seat; and when the pressure of the fluid exceeds a predetermined amount, the valve body can be elastically deformed until the valve body is press-contacted with at least an annular portion of the valve seat surrounding the receiving portion and thereby completely closing the receiving portion.

* * * * *